Nov. 25, 1958    R. E. BACHMAN    2,861,437

PRECISION COUPLING DEVICE

Filed Oct. 25, 1957

INVENTOR.
RUDOLPH E. BACHMAN
BY
Leonard H. King

United States Patent Office 2,861,437
Patented Nov. 25, 1958

2,861,437

PRECISION COUPLING DEVICE

Rudolph E. Bachman, Manor Haven, N. Y., assignor to Sterling Precision Corporation, Flushing, N. Y.

Application October 25, 1957, Serial No. 692,433

4 Claims. (Cl. 64—15)

The present invention relates to a flexible coupling device adapted to connect a driving shaft to a driven shaft whereby rotary motion is transmitted to the driven shaft with the minimum of backlash. This device is specifically adapted to be used with control mechanisms such as servos or the like, where there is continuous operation over long periods of time involving rapid starting, stopping and reversal of shaft motion, and where the motor units involved are of low power producing in general, low torque. Flexible coupling devices presently in use are primarily intended as cushioning and shock-absorbing devices for connecting shafts having relatively large power and generating large torque. In such coupling devices backlash prevention is a minor consideration and there is frequently a measurable angular displacement between the driving and driven shaft, due to backlash. Such angular errors cannot be tolerated in servo-mechanism applications. Thus devices employing a multiplicity of very flexible spring members, each one easily twisted out of axial alignment, do not have the inherent rigidity to resume the "zero position," i. e., the original axial alignment position. In extreme cases, the twisting action of these spring members is deliberately designed to take place, as a brake means to limit the radial angle by which the driven shaft will lag behind the drive shaft. However, in servo-mechanisms such lag in tracking between components cannot be tolerated.

Moreover, spring devices of the above type are frequently embodied in an independent structure interposed between two shafts to serve as a flexible link. These devices suffer from the disadvantage of increasing the overall length of the assembly, and involve complexity of manufacture and installation. Moreover, in many cases they do not allow for slight axial misalignment between the shafts and for a certain amount of axial play, that is, the coaxial separation and coming together of the two shafts involved.

An improved flexible coupling device must allow for some degree of misalignment between shafts or for some translational motion along the connected shafts. If this is not done there will be introduced into the system strains and loading errors that will markedly effect the accuracy of the device. Thus an improved device would rigidly secure one portion of the flexible coupling to one shaft, and leave the linkage means relatively free to move on the other shaft, as by having these means slidably received on the other shaft, thus distributing the strains in the system.

In designing a device of this type, namely where a flexible member is rigidly positioned on one shaft and slidably received on a second shaft, it is necessary to provide that the sliding fit be free of loading and friction as much as possible. Thus, if a flexible pin or prong-like structure is used as the coupling means betwen the shafts, such pin or prong must be securely gripped by the complementary shaft, yet not receive any friction or shearing force due to rapid start and stopping, or reversal of rotation of the shafts. Thus the use of small apertures to retain such pin or prong structure would introduce a shearing force on the said pin with each change of shaft speed or direction. Also, the use of such apertures necessarily implies the careful alignment of the parts, with consequent complexity in installation. Thus the avoidance of aperture retaining means in favor of an open structure would serve to prevent internal strains from developing in the system, thus greatly increasing the efficiency of such a device for use in servo-mechanisms.

A drawback in coupling devices presently in use is that a blind fit is not possible between two confronting shafts. Thus, if the shaft coupling were enclosed in a protective housing, which is frequently the case, it would ordinarily be necessary to dismantle the housing, or at least fit it with an access opening, to couple or remove the shafts. In the present device a shaft can be moved axially to mate with a confronting shaft, or can be readily removed by axial movement for servicing or replacement, leaving the housing in position, but with no dismantling necessary.

A further defect inherent in the use of aperture means to retain flexible coupling pins is that the pins are thereby constrained against any radial outward movement. Thus, where there is noticeable misalignment between the shafts, the pins receive a distortion and loading error through being bent out of axial line. This is specifically overcome in the present device by providing that the flexible coupling means be rigidly retained on a first shaft and slidingly engage a second shaft, whereby there is no radially outward bending of this flexible coupling.

It is, therefore, a primary object of the present invention to provide for a flexible coupling device of simple open construction permitting of a uniform transfer of driving torque with a minimum of backlash and internal strain developed.

Yet another object of the present invention is to provide flexible coupling means between two shafts where there exists some degree of misalignment between the shafts and also where there is a certain amount of axial play between the shafts.

It is yet a further object of the present invention to provide for a flexible coupling adapted for use with servo-mechanisms, where extreme compactness and miniaturization may be required.

It is still a further object of the present invention to provide flexible coupling means for connecting shafts having a certain range of variation in the diameter of said shafts.

It is yet a further object of the present invention to provide flexible coupling means that are integral with the shafts, thus avoiding the use of independent coupling units positioned between the shafts.

These and other objects and advantages of the present invention will become apparent from the following description and the drawings therefor.

Figure 1:
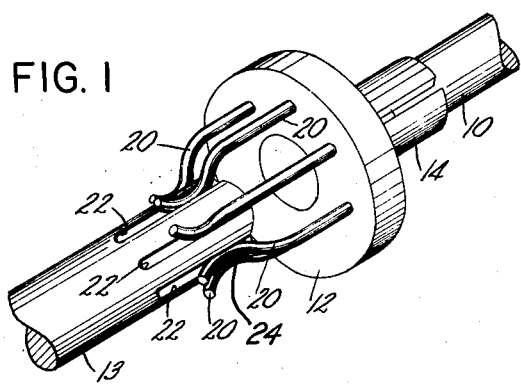
Figure 1 is a view in perspective of the device of the present invention.
Figure 2:
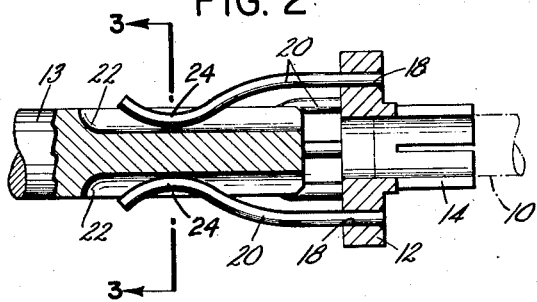
Figure 2 is a view in longitudinal cross-section of the device of the present invention.

The device provides for complementary inter-engaging structures carried by two shafts in axial alignment. While the device is adapted to function where there is some degree of misalignment, it is intended that in normal use the shafts be in substantial end-to-end alignment. Shaft 10 has rigidly affixed at one end thereof a prong-retaining collar 12, which is attached to shaft 10 by neck portion 14 as by means of a split hub. Alternatively a set screw, lock pin or other fastening means may be employed to fasten neck portion to shaft 10. Neck 14 and collar 12 comprise a unitary structure, formed of brass or similar material. Apertures 18 are formed in collar 12 in spaced annular arrangement, as shown in Figures 1 and 2. Flexible prongs 20 are set into these apertures and are rigidly soldered into position, as shown in Figure 2, and project axially forward on the shaft. These prongs are of spring wire and have a high degree of strength and flexibility. To effect coupling between the shafts prongs 20 are brought into close abutting relationship with splines 22 formed at the free end portion of shaft 13, the number of splines corresponding to the number of prongs. It will be understood that the device will operate equally well if fewer prongs are used than the number of splines, provided there is equal spacing of the prongs about the periphery of the second shaft. Prongs 20 are biased inwardly at portion 24, formed at the free ends of said prongs. Portion 24 is of inwardly-curved offset configuration, and has the form of a segment of a semicircle, engaging the corresponding spline tangentially in close yielding registry. Each prong thus engages the corresponding spline tangentially at a point on said portion 24, depending on the axial alignment of the two shafts. Thus, if there is marked misalignment between the shafts, the point of tangency will be shifted for each prong, but there will be no outward movement of the prong itself, hence no thrust to be transferred to the retaining collar 12. This is an important point of advantage of the present device, whereby the flexible coupling unit is kept free of radial thrust effects to a great extent.

Figure 3:
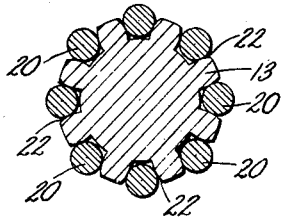
Figure 3 is a sectional view taken on the line 3—3 of Figure 2.

Also, the splines are so formed that there is no lateral play of the prongs against the spline walls, as shown in Figure 3. Thus, where one of the said shafts imparts rotational motion to the other there will be no backlash present. It should be noted that the length of the spline is such that there is adequate room for axial movement of spline 20 along shaft 13. Therefore, no longitudinal distortion or compression of these prong portions can occur, and no loading or strain is brought into the system. It should also be noted that the open construction of the units provides for maximum ease of assembly or dismantling. Since it is contemplated that the present device be employed in components having low power and low torque the inward pressure of the prongs is sufficient to connect the two shafts and transmit rotation to the driven shaft. The coupling element is of narrow diameter, that is, a little wider than the dimension of the shafts involved, therefore, compactness and miniaturization is readily provided for, if desired. It should also be noted that the arrangement of the prongs permit a certain range of variation in the diameter of the splined shaft, thus extending the utility of the present device.

Figure 4:
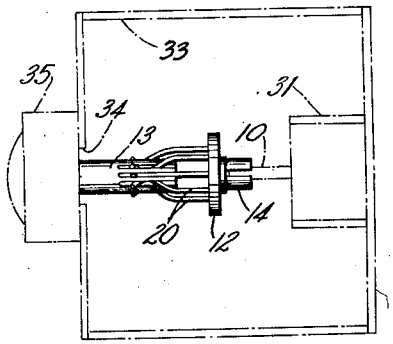
Figure 4 is a view in perspective, shown partly cut away, of the device of the present invention, with a protective housing enclosing the device.

As shown in Figure 4, driven equipment 31 (shown in phantom) may be furnished with a protective housing 33, to prevent accidents and keep out dust. Opening 34 is formed in said housing to admit splined shaft 13. It will be appreciated that this opening need be only large enough to admit this shaft, and that furthermore a blind fit can be made, i. e., the shaft is introduced into the shaft and engages the prongs on the confronting shaft 10. Therefore there is no need to dismantle the housing either in inserting shaft 13 or in removing it, as for replacement of the motor 35 and/or shaft 13. This is a distinct advantage of the present device over existing linkage devices, wherein a collar is disposed on each shaft end, to mount the given coupling unit. Thus, to remove a shaft axially where a collar is used, the housing unit would have to be dismantled. This is avoided in the present invention.

Figure 5:
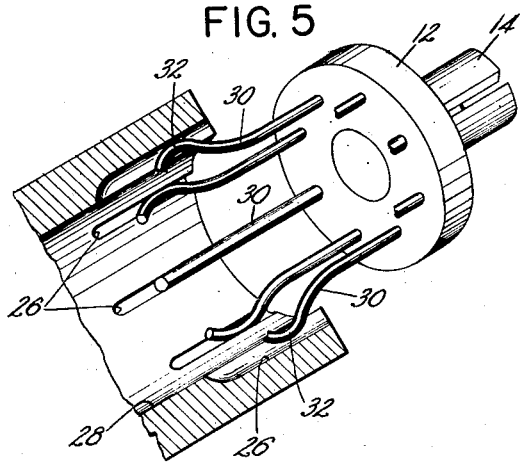
Figure 5 illustrates another embodiment of the present invention.

As shown in Figure 5, the device may be modified by disposing grooves 26 within bore 28, formed in shaft 13, and said grooves being adapted to register with prongs 30, which in the modification shown, have an outward bias at portion 32, the said prongs being rigidly secured to collar 12. This embodiment retains all the desirable features of the basic device, namely flexibility of coupling with zero backlash, however added compactness and security of clamping the connecting element is achieved by having the prongs retained against radial outward thrust.

Having thus described a preferred embodiment of the invention, what is claimed is:

1. A flexible coupling device for connecting a first rotatable shaft to a second rotatable shaft, said shafts being in substantial axial alignment, comprising complementary coupling members at the mutually confronting ends of said shafts, the coupling member of said first shaft comprising a plurality of flexible prongs rigidly secured at their base portion proximate to the end of said first shaft in annular configuration about the axis of said first shaft, the free ends of said prongs projecting axially forward of the free end of said first shaft, the free ends of said prongs being in the form of an axially curved offset portion biased towards the coupling member of said second shaft, and the coupling member of said second shaft comprising a plurality of spaced longitudinal indentations formed on the periphery thereof of a configuration adaped to register with a portion of the said prongs of said first shaft, whereby said axially curved offset portions will resiliently engage said indentations to couple the said first shaft to said second shaft in torque-transfer relation.

2. A device as in claim 1, wherein the said indentations in the said second shaft comprise spaced splines.

3. A flexible coupling device for connecting a first rotatable shaft to a second rotatable shaft, comprising complementary coupling members at the mutually confronting ends of said shafts, the coupling member of said first shaft comprising a plurality of flexible prongs rigidly secured at their base portion proximate to the end of said first shaft in spaced annular configuration about the axis of said first shaft, the free ends of said prongs projecting axially forward of the free end of said first shaft, said free ends of said prongs being biased inwardly towards and converging towards the axis of said first shaft, the said inward biasing means comprising an axially inwardly curved offset portion formed on said prongs, and the coupling member of said second shaft comprising a plurality of spaced longitudinal indentations formed on the periphery thereof of a configuration adapted to tangentially abut with and slidingly receive a portion of said inwardly offset portion of each of said prongs, whereby said prongs will maintain the said axial forward projecting position without radial displacement despite considerable misalignment between said first shaft and said second shaft during torque transfer between the said shafts.

4. A flexible coupling device for connecting a first rotatable shaft to a second rotatable shaft, comprising complementary coupling members at the mutually confronting ends of said shafts, the coupling member of said first shaft comprising a plurality of flexible prongs rigidly secured at their base portion proximate to the end of said first shaft in spaced annular configuration about the axis of said first shaft, the free ends of said prongs projecting axially forward of the free end of said first shaft, said free ends of said prongs being biased radially outward from the axis of said first shaft, the said radial outward biasing means comprising an axially outward curved offset portion formed on said prongs, and the coupling member of said second shaft comprising an axial bore formed in second shaft, a plurality of spaced longitudinal grooves formed in the said bore of a configuration adapted to tangentially abut with and slidingly receive a portion of said curved offset portion formed on said prongs, whereby said prongs will maintain the said axial forward projecting position without radial displacement despite considerable misalignment between said first shaft and said second shaft during torque transfer between the said shafts.

References Cited in the file of this patent

UNITED STATES PATENTS

| | | |
|---|---|---|
| 2,441,038 | Siesel | May 4, 1948 |
| 2,558,158 | Rock | June 26, 1951 |